E. A. RITTER.
WATER METER.
APPLICATION FILED MAR. 26, 1920.

1,390,645.

Patented Sept. 13, 1921.

WITNESSES:
Earl R. Ryder
W. J. Chillew

INVENTOR
Edward A. Ritter

UNITED STATES PATENT OFFICE.

EDWARD A. RITTER, OF AMHERST, NEW YORK, ASSIGNOR TO GEORGE B. BASSETT, OF BUFFALO, NEW YORK.

WATER-METER.

1,390,645. Specification of Letters Patent. Patented Sept. 13, 1921.

Application filed March 26, 1920. Serial No. 369,077.

*To all whom it may concern:*

Be it known that I, EDWARD A. RITTER, a citizen of the United States, residing at Amherst, in the county of Erie and State of New York, have invented a new and useful Water-Meter, of which the following is a specification, reference being had to the drawings accompanying and forming a part thereof.

My invention relates to improvements in water meters in which the several principal parts of the meter are held in their normal position relative to each other at all usual pressures by fastenings that will release them when the meter is subject to an extraordinary pressure such as that due to the water it may contain freezing.

The objects of my present invention are principally to so arrange the fastenings of the meter that they may be tightened to any ordinary degree of strain without distorting or breaking the principal parts of the meter and at the same time will release such parts when the water in the meter freezes.

I will now proceed to definitely describe the manner in which I have carried out my invention and then claim what I believe to be novel.

Figure 1:
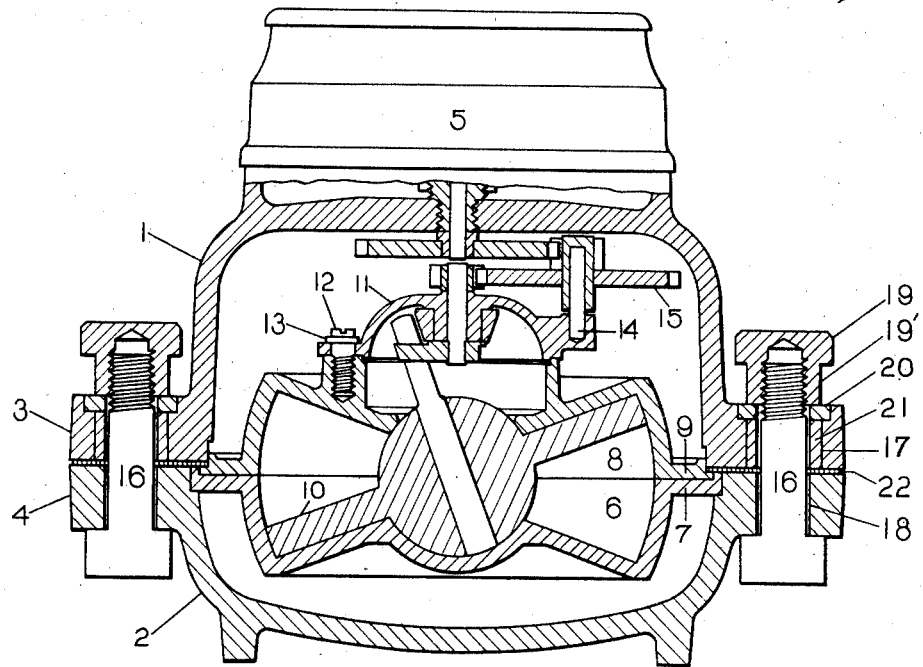
Figure 2:
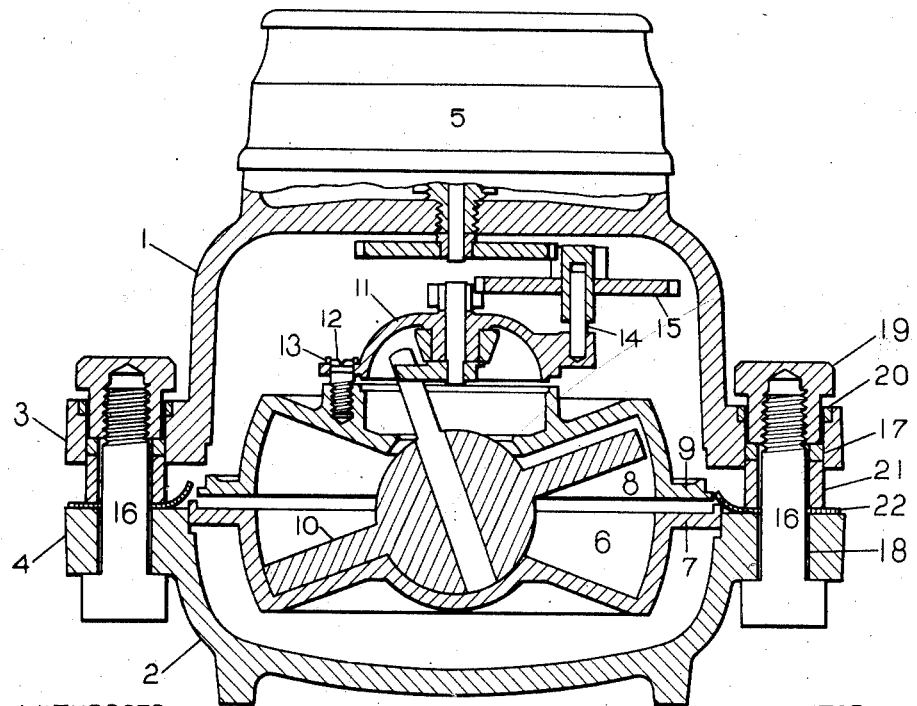

In the drawings, Figure 1 shows a vertical section of my improved meter, showing the principal parts of the meter and the fastenings of same in normal position. Fig. 2 is a vertical section of my improved meter taken in the same plane as Fig. 1 but after the meter has frozen, showing how the fastenings release and the parts separate.

The outer casing of the meter is composed of two detachable parts 1 and 2 which are held together by bolts passing through the meeting flanges 3 and 4, formed on same between which is supported the water operated mechanism, which in this drawing is shown as of the well known nutating disk type. The register hood 5 is located on top of outer casing 1 and contains a register not shown. The measuring chamber is composed of lower half 6 formed with supporting flange 7, and upper half 8 formed with supporting flange 9. The nutating measuring disk 10 is inclosed and loosely supported between the halves 6 and 8 of the measuring chamber. The intermediate gear plate 11 is fastened on top of measuring chamber half 8 by means of screw 12 which is provided with a shearing pin 13, passing through a hole drilled in same. In gear plate 11 is rigidly fastened intermediate gear post 14 on which is loosely supported toothed intermediate gear and pinion 15. Meeting flanges 3 and 4 are fastened together while in normal relation by clamping bolts 16 passing through flange holes 17 and 18. On the ends of bolts 16 are clamping nuts 19, the bottoms of which adjacent to flange 3 have collars 19' of a diameter that will permit them entering flange holes 17. In recesses formed around holes 17 on the outer side of flange 3 are shearing washers 20, which I make of suitable substance to withstand all ordinary strains due to tightening clamping nuts 19 so long as they are supported by the loose bushings 21, which surround bolts 16 and are in turn supported by the flange packing 22, backed up by the surface of flange 4, but constructed to give way by shearing due to the separating of flanges 3 and 4 caused by the water in the meter freezing. While shearing washers 20 may be made of many different substances, I have found by experiment that shearing washers made of lead alloyed with antimony as a hardener work well in practice.

Having described above a construction of my improved meter, I will now describe its advantages and action.

When the parts of the meter are assembled and the meeting flanges 3 and 4 are joined with gasket 22 resting between them; supporting bushings 21 are dropped into holes 17 in which they loosely fit; shearing washers 20 are placed in the recesses formed around the top of the holes 17; clamping bolts 16 are inserted through flange holes 18 and the holes in supporting bushings 21 and shearing washers 20 and clamping nuts 19 are screwed down tightly so their shearing collars 19' press against shearing washers 20, the whole clamping the two flanges 3 and 4 and the gasket 22 between them firmly together; the parts of the meter and the clamping devices being as shown in Fig. 1. The meter is then put on a water service and left in operation. In due course of time the water in the meter is allowed to freeze. As the pipes entering and leaving the meter are smaller than the meter they freeze solid first so that as the larger body of water in the meter freezes, it can not escape through the pipes and the pressure on the interior of the meter gradually increases until the outer cases 1 and 2 of the meter are forced apart due to the gradual pulling of the shearing collars 19' on the clamping nuts and bolts through shearing washers 20, and the parts of the meter and the clamping devices take the positions shown in Fig. 2. At the same time gear plate 11 is separated from measuring chamber half 8, due to the shearing of shearing pin 13 in screw 12 before any distortion of either takes place.

Heretofore it has been necessary to tighten clamping nuts and bolts in somewhat similar types of meters a predetermined amount only or the releasing device would break due to the strain. In practice this is very difficult to do. In my improved meter no matter how tightly the clamping nuts and bolts are tightened, the shearing washers which are the releasing devices are not affected being supported by bushings 21, but are always in their normal condition ready to act when the meter freezes.

While I have shown my invention as adapted to a disk water meter for purposes of illustration, I do not wish to confine it to this style of meter only; as it obviously may be adapted to many other styles of water meters with equally good results. Also while I have shown the clamping device with the shearing collar on the nut it may be formed on the head of the bolt or the head of a screw, or it may be an entirely separate collar or otherwise formed or used without departing from the spirit of my invention.

Having thus described my invention, what I claim and desire to secure by Letters Patent is:—

1. A releasable fastening device comprising a supporting bushing, a shearing washer and a clamping bolt passing through both said bushing and said washer; substantially as described.

2. A releasable fastening device comprising a supporting bushing, a shearing collar and a shearing washer between said bushing and said collar; substantially as described.

3. A releasable fastening device, comprising a shearing washer, a supporting bushing, a clamping bolt passing through both said washer and said bushing and a shearing collar on said bolt; substantially as described.

4. A releasable fastening device comprising a meeting flange having a hole through it, a supporting bushing in said hole, a shearing washer, and a clamping bolt passing through said bushing and said washer; substantially as described.

5. A releasable fastening device comprising a meeting flange having a hole through it, a supporting bushing in said hole, a shearing collar and a shearing washer located between said bushing and said collar; substantially as described.

6. A releasable fastening device comprising a meeting flange having a hole through it, a supporting bushing in said hole, a shearing washer, a clamping bolt passing through both said bushing and said washer, and a shearing collar located on said bolt; substantially as described.

7. A releasable fastening device comprising a meeting flange having a hole through it with a recess formed around the outside edge of said hole; a supporting bushing in said hole, a shearing washer in said recess, a clamping bolt passing through both said bushing and said washer, and a shearing collar located on said bolt; substantially as described.

8. A water meter comprising a separable part of the meter casing having a hole through it, a supporting bushing in said hole, a shearing washer, and a clamping bolt passing through both said bushing and said washer; substantially as and for the purpose described.

9. A water meter comprising a separable part of the meter casing having a hole through it, a supporting bushing in said hole, a shearing collar and a shearing washer located between said bushing and said collar; substantially as and for the purpose described.

10. A water meter comprising a separable part of the meter casing having a hole through it, a supporting bushing in said hole, a shearing collar, a clamping bolt passing through both said bushing and said washer, and a shearing collar located on said bolt; substantially as and for the purpose described.

11. A water meter comprising a separable part of the meter casing having a hole through it with a recess formed around the outside edge of said hole, a supporting bushing in said hole and a shearing washer in said recess, a clamping bolt passing through both said bushing and said washer, and a shearing collar located on said bolt; substantially as and for the purpose described.

12. A water meter comprising a separable part having a hole through it, a screw passing through said hole and a shearing pin passing through a hole in said screw and bearing on said part; substantially as and for the purpose described.

13. A water meter comprising a separable part of the meter casing having a hole through it, a shearing washer, a clamping bolt passing through said hole and said washer and a shearing collar located on said bolt; substantially as and for the purpose described.

EDWARD A. RITTER.

Witnesses:
EARL R. RYDER,
W. J. CHELLEW.